J. F. CHUMBLEY.
AUTOMOBILE JACK.
APPLICATION FILED FEB. 12, 1919.
1,307,080.
Patented June 17, 1919.
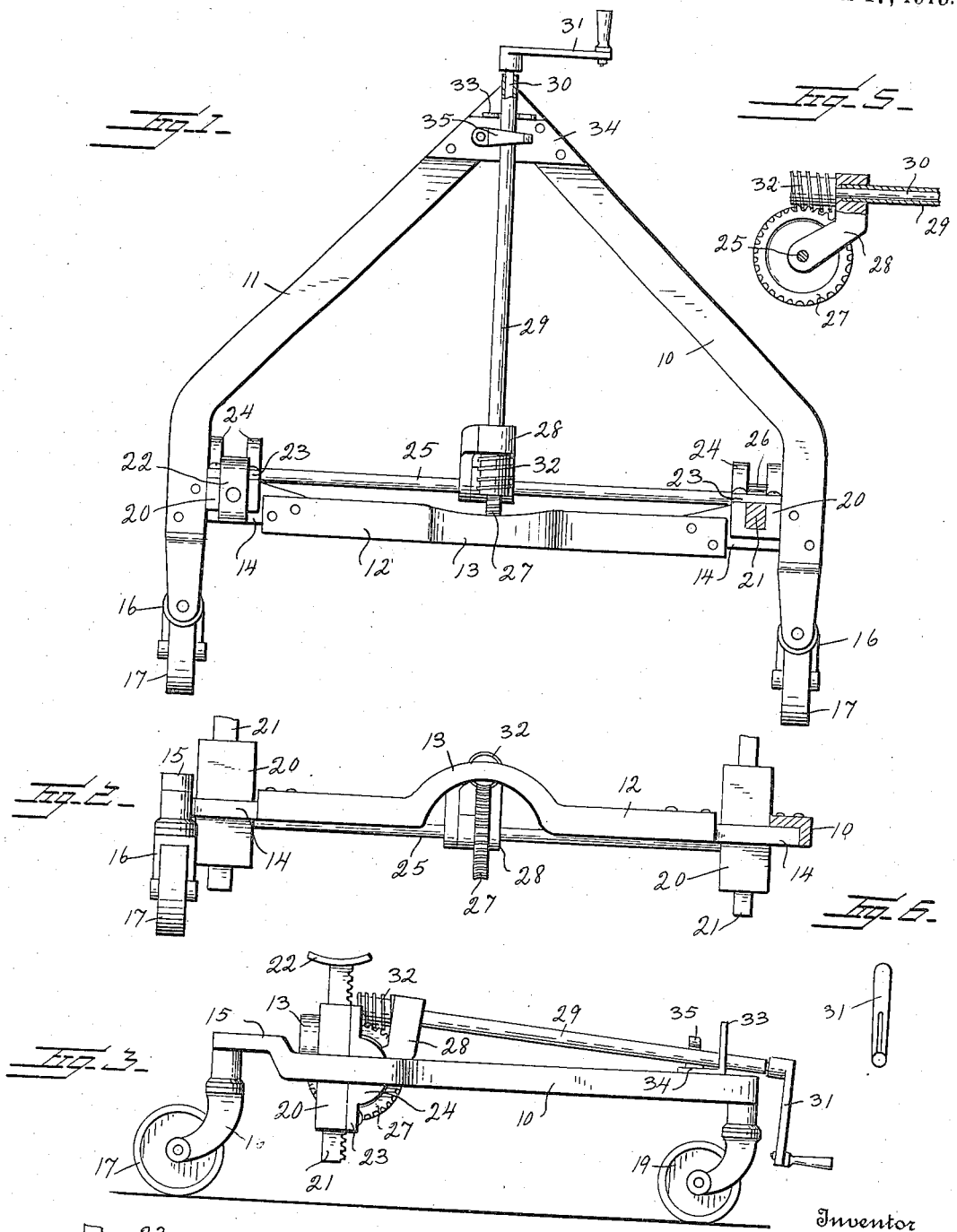
Inventor
J. F. Chumbley
By 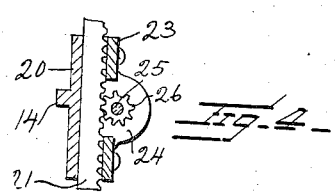
Attorney

UNITED STATES PATENT OFFICE.

JOHN ELBERT CHUMBLEY, OF NASHVILLE, TENNESSEE.

AUTOMOBILE-JACK.

1,307,080.

Specification of Letters Patent. Patented June 17, 1919.

Application filed February 12, 1919. Serial No. 276,509.

*To all whom it may concern:*

Be it known that I, JOHN E. CHUMBLEY, a citizen of the United States, residing at Nashville, in the county of Davidson and State of Tennessee, have invented certain new and useful Improvements in Automobile-Jacks, of which the following is a specification, reference being had to the accompanying drawings.

This invention relates to jacks or like lifting devices, and particularly to jacks designed for use in garages and other machine shops for the purpose of raising automobiles off the ground or in lifting other machines or weights.

The general object of the invention is to provide a structure of this character which may be readily shifted from place to place in a garage and readily disposed beneath the rear axle of an automobile or other vehicle and operated to raise the vehicle.

A further object is to provide a structure of this character which includes lifting jacks proper and means for lifting the jacks comprising a shaft and an operating member so connected to the shaft that when it is rotated it will rotate the shaft and when it is shifted vertically it will act as a lever to oscillate the shaft.

And a further object is to provide means which will lock the member constituting the lever in its depressed position.

A further object is to improve the details of construction and arrangements of parts in structures of this character.

My invention is illustrated in the accompanying drawings, wherein:—

Figure 1 is a plan view of a jack constructed in accordance with my invention;

Fig. 2 is a front end elevation of the jack;

Fig. 3 is a side elevation thereof;

Fig. 4 is a vertical sectional view through one of the guides 20;

Fig. 5 is a side elevation of the yoke and worm wheel, the upper portion of the yoke being broken away and the sleeve 29 being in section; and Fig. 6 is a front view of the crank handle 31.

Referring to these drawings, it will be seen that the frame of the jack is approximately triangular in plan view and comprises the converging angle iron frame beams 10 and 11 which, at their rear ends, are bent to extend parallel with each other and the transversely extending forward angle iron frame beam 12 which, at its middle, is arched upward, as at 13. The cross beam 12 is connected to the extremities of the beams 10 and 11 by means of connecting webs or irons 14 or in any other suitable manner.

Preferably, the beams 10 and 11 are extended beyond the irons 14 of the cross beams 12 and bent upward, as at 15, and to each upwardly bent ends of the beams is rotatably connected a standard or yoke 16 of a caster wheel 17. At the apex of the triangle, there is also provided a yoke or standard and a caster wheel 19. These caster wheels are mounted on roller bearings in the standards and the standards are in turn mounted in ball bearings on the frame so that the standards have free rotation in a horizontal plane and the rollers have free rotation in a vertical plane.

Mounted at opposite ends of the transverse beam 12 and preferably forming part of the irons 14 and being cast therewith, are the vertical sections 20 which are U-shaped in cross section, and sliding vertically in these U-shaped sections 20 are the rack bars 21 formed with teeth on one face and carrying the saddles 22 at their upper ends, and closing the open sides of the sections 20 are the sections or caps 23 which are attached to the sections 20 by means of screws or in any suitable manner, and which are formed with ears 24 and with a ball bearing for a transverse shaft 25 which carries pinions 26 engaging through slots in the section 20 with the teeth on the racks 21. Mounted upon the shaft 25 at its middle is a worm gear wheel 27, and it is for the purpose of accommodating this worm gear wheel that the transverse beam 12 is arched. Mounted upon this shaft for rotation therearound, is a yoke 28 which embraces the worm gear wheel 27 and its hub.

The upper end of this yoke is formed with a passage extending transversely of the shaft 25 and disposed immediately above the gear wheel 27 and extending from this passage in the yoke and across the apex of the frame is a tubular housing 29. Through this housing extends a shaft 30 which, at one end, carries a crank or slotted crank handle 31 and which, at its opposite end, which projects beyond the yoke 28, carries a worm 32 engaging the worm wheel 27. It will be obvious now that a rotation of the handle 31 in one or the other direction will cause the raising or lowering of the jacks or racks 21 and it will also be obvious that a vertical oscillation of the tubular member 29 and the shaft 30 will cause an oscillation of the gear wheel 27. It will thus be seen that the member 29 constitutes really a lever operatively connected to the pinion shaft 25 to cause an oscillation of greater or less amplitude and that this lever carries the shaft 25 which, when rotated in one direction or the other will cause the rotation of the pinions 26.

It is obvious that if there is sufficient downward pressure on the racks 21, that the pinions 26 will be caused to rotate, which will rotate the shaft 25, and that the free end of the member 29 will thus rise. In order to lock it in its lowered position with the jacks raised, I provide a bifurcated guide 33 which is mounted upon the frame at the apex thereof, this guide having a base plate 34 attached to the frame, and mounted upon this base plate is a pivoted latch 35 which may be rotated over the member 29 and will thus hold the free end of said member lowered against pressure on the jacks or racks 21.

It will be seen that a structure of the character heretofore described is very simple and convenient. The frame, it will be noticed, is underhung with relation to the caster wheels 17 and 19 so that the frame may be readily shifted beneath any motor car and the jacks 21 then caused to move vertically upward so as to lift the motor car to any desired height within the range of the mechanism. It will be seen that the sleeve 29 and the shaft 30, the worm 32 and the gear wheel 27, together constitute a lever whereby the jacks may be raised or lowered a certain distance by vertically oscillating this lever and that the jacks may be also raised or lowered by rotating the crank handle 31 which, through the shaft 30 and the worm 32, will rotate the gear wheel 27. Thus, the jacks 21 may be lowered to a predetermined distance from the floor of the garage by rotating the handle 31, then they may be further lowered to get them beneath the rear axle housing of the automobile by raising the lever, constituted by the member 29, then the frame may be shifted to carry the jacks beneath the housing or any other part of the machine, then by lowering the lever, constituted by the member 29, and locking it, the jacks will be raised to carry the saddles into engagement with the rear axle housing of the automobile and then by rotating the crank 31, the automobile may be raised to the proper height, or the crank 31 might be rotated while the shaft 30 and sleeve 29 are in their raised position to thereby lift the jacks, and then finally the parts 29 and 30 may be brought to a horizontal position and latched to exert a final lifting movement upon the machine.

The reverse of this occurs when it is desired to lower the machine and remove the jacks from beneath it. If great power is not necessary in order to lift the machine and it is required only to lift it a very slight degree, it may be lifted entirely by the leverage exerted by members 29 and 30. If, however, a greater lift is required or a greater power is necessary, then it may be lifted by rotating the crank handle 31. It will thus be seen that the jack is adapted for use under varied conditions, which is not the case with an ordinary jack. It is also possible to raise the rear end or forward end of the machine and then shift the machine and the jack across the floor of the garage to any desired place. The crank handle 31 is longitudinally slotted, as seen in Fig. 6, so that the handle proper can be adjusted along this slot in order that the leverage exerted by the crank may be adjusted and in order that the jacks may be raised without turning the handle so many times.

While I have illustrated certain details of construction which I have found to be particularly desirable in practice, I do not wish to be limited thereto, as it is obvious that many changes might be made without departing from the spirit of the invention.

I claim:—

1. A jack of the character described including a wheeled supporting frame, a pair of bars mounted on the frame, a shaft, pinions on the shaft engaging the said bars, and unitary means for oscillating said shaft or for rotating the shaft.

2. A jack of the character described comprising a supporting frame, a pair of vertically operating rack bars mounted upon said frame and constituting jacks, a shaft mounted on the frame and having pinions engaging said rack bars, oscillatable means for oscillating said shaft or for giving rotary movement to said shaft, and means for locking said oscillating means from oscillation.

3. A jack of the character described comprising a wheeled supporting frame, vertically movable rack bars mounted upon said frame and constituting jacks, a shaft mounted on the frame and having pinions engaging the rack bars, a worm wheel on the shaft, a yoke embracing the worm wheel and pivotally connected to the shaft, a manually rotatable shaft carried by said yoke and having a worm engaging said worm wheel whereby the shaft, yoke, worm wheel, and first named shaft may be oscillated or the shaft rotated to cause the rotation of the first named shaft, and means for locking the second named shaft with its free end in a depressed position.

4. A jack of the character described including a frame triangular in plan and having supporting caster wheels at its corners, vertically movable rack bars constituting jacks and operatively supported upon the frame at the ends of the base of said triangle, a shaft operatively supported upon the frame and having pinions engaging the rack bars, a worm wheel mounted upon the shaft, a yoke pivotally mounted upon the shaft and embracing the worm wheel, a tubular member extending from said yoke toward the apex of the frame, a rotatable shaft passing through the tubular member and carrying a worm engaging said worm wheel, a handle for rotating the second named shaft, and a latch on the apex of the frame for holding the tubular member and second named shaft in a depressed position but shiftable to permit them to be oscillated in a vertical plane.

5. A jack of the character described including a wheeled supporting frame, vertically disposed rack bars mounted upon the frame, a shaft having pinions engaging said rack bars, a worm wheel thereon, a yoke pivoted on the shaft and embracing the worm wheel, a sleeve extending from said yoke at right angles to the shaft, a worm shaft extending through the sleeve and having a worm engaging the worm wheel and at its opposite ends having means whereby it may be rotated, and means on the frame for holding the sleeve and one shaft from vertical oscillation, but shiftable out of engagement with said sleeve to permit the vertical oscillation of the sleeve and worm shaft.

6. A jack of the character described including a triangular frame, vertically disposed boxes mounted upon the frame at the base of said triangle, caster wheels supporting the corners of the frame, vertically disposed rack bars mounted in said boxes and carrying pinions engaging said rack bars, a medially disposed worm wheel mounted on the jack to rotate therewith, a yoke having arms pivoted on the shaft and embracing said worm wheel, a sleeve extending from the yoke toward the apex of the triangular frame, a worm shaft passing through said sleeve and yoke and carrying a worm engaging the worm wheel and at its opposite end carrying a crank, and a latch pivotally mounted on the apex of the frame shiftable into position into or out of engagement with the sleeve.

7. A jack of the character described comprising a supporting frame, a member mounted for vertical movement on the frame and constituting a jack proper, a shaft operatively engaging said member, a rotatable shaft extending at right angles to and swingingly connected to the first named shaft and carrying a worm, a worm gear wheel mounted on the first named shaft to rotate therewith and engaged by said worm, and means on the free extremity of the second named shaft whereby it may be rotated, said second named shaft constituting a lever whereby the first named shaft may be oscillated.

In testimony whereof I hereunto affix my signature in the presence of two witnesses.

JOHN ELBERT CHUMBLEY.

Witnesses:
O. B. HOFSTETTER,
W. C. MCCRORY.